US012671509B2

(12) United States Patent
Iri

(10) Patent No.: US 12,671,509 B2
(45) Date of Patent: Jun. 30, 2026

(54) RECEIVER AND TRANSCEIVER

(71) Applicant: Uniden Holdings Corporation, Tokyo (JP)

(72) Inventor: Koji Iri, Tokyo (JP)

(73) Assignee: UNIDEN HOLDINGS CORPORATION, Tokyo (JP)

( * ) Notice: Subject to any disclaimer, the term of this patent is extended or adjusted under 35 U.S.C. 154(b) by 316 days.

(21) Appl. No.: 18/508,205

(22) Filed: Nov. 13, 2023

(65) Prior Publication Data

US 2025/0023651 A1 Jan. 16, 2025

Related U.S. Application Data

(60) Provisional application No. 63/513,578, filed on Jul. 14, 2023.

(51) Int. Cl.
*H04H 20/30* (2008.01)
*H04H 20/42* (2008.01)
*H04H 40/27* (2008.01)

(52) U.S. Cl.
CPC .......... *H04H 20/30* (2013.01); *H04H 20/426* (2013.01); *H04H 40/27* (2013.01)

(58) Field of Classification Search
CPC ....... H04H 20/30; H04H 20/426; H04H 40/27
See application file for complete search history.

(56) References Cited

U.S. PATENT DOCUMENTS 4,170,014 A * 10/1979 Sully ........................ H01Q 9/30 336/208
6,233,443 B1 * 5/2001 Brommer ............... H04B 1/126 455/212
6,564,041 B1 * 5/2003 Stogner .................. H03G 3/342 455/212
2024/0383495 A1 * 11/2024 Harrison ................ G08G 1/091

FOREIGN PATENT DOCUMENTS

JP S56-152439 U 11/1981

* cited by examiner

*Primary Examiner* — Raymond S Dean
(74) *Attorney, Agent, or Firm* — Kenealy Vaidya LLP

(57) ABSTRACT

Provided is a receiver capable of receiving an FM radio wave and an AM radio wave in a same frequency band (same channel). The receiver includes: a detection voltage output unit that outputs FM detection voltage obtained by detecting the FM radio wave when the FM detection voltage is determined to be at or above a first threshold; and a threshold change unit that sets the first threshold to a first value when a noise amount included in the FM detection voltage before threshold determination by the detection voltage output unit is larger than a predetermined value, and that sets the first threshold to a second value smaller than the first value when the noise amount is smaller than the predetermined value.

10 Claims, 11 Drawing Sheets

FIG. 4

| | AM detection | Fm squelch | FM detection | AM/FM |
|---|---|---|---|---|
| 1 | Below threshold | no signal | Below threshold (variable) | AM |
| 2 | Below threshold | no signal | Above threshold (variable) | AM |
| 3 | Below threshold | with radio waves | Below threshold (variable) | state keep |
| 4 | Below threshold | with radio waves | Above threshold (variable) | FM |
| 5 | above threshold | no signal | Below threshold (variable) | AM |
| 6 | above threshold | no signal | Above threshold (variable) | AM |
| 7 | above threshold | with radio waves | Below threshold (variable) | AM |
| 8 | above threshold | with radio waves | Above threshold (variable) | AM |

RECEIVER AND TRANSCEIVER

CROSS-REFERENCE TO RELATED APPLICATION

This application claims the benefit of priority under 35 U.S.C. 119(e) to U.S. Provisional Patent Application No. 63/513,578 filed on 14 Jul. 2023, the disclosure of which is hereby incorporated by reference in its entirety.

BACKGROUND OF THE INVENTION

1. Field of the Invention

The present invention relates to a receiver and a transceiver, and relates to, for example, a transceiver that can perform transmission and reception of frequency modulation (FM) and amplitude modulation (AM) in the same frequency band.

2. Description of the Related Art

In September 2021, use of a FM method by citizen band radio (CB radio) was approved by the Federal Communication Commission (FCC). Use of both modulation methods of AM and FM in the same channel has thereby become possible. Specifically, CB radio in which reception is possible in both modulation methods of AM and FM has become usable in the United States.

Conventionally (for European market and the like), switching of AM and FM is performed through a user operation such as a slide switch. However, the present invention automatically performs the switching of AM and FM to simplify the operation and eliminate the need of the user having to know whether the user is using AM or FM. J P Sho 56-152439U ((1) of scope of claim and FIGS. 1 and 2 of the utility model registration) discloses a transceiver in which a first switch is connected between a FM detection circuit and an output terminal, the first switch configured to operate depending on presence or absence of an interstation muting signal (or FM detection output).

SUMMARY OF THE INVENTION

A carrier signal cannot be correctly received even in AM non-modulation when the electric field of the carrier signal is weak. Moreover, since this carrier signal is demodulated on the FM reception side, a noise level (DC level) of an FM detection voltage (for example, FM_DET) increases. Accordingly, if the presence or absence of the detection signal is determined by using a fixed threshold as in the technique described in J P Sho 56-152439U, FM is erroneously detected in the weak electric field.

The present invention has been made in view of the aforementioned problems, and an object is to provide a receiver and a transceiver that can correctly output an FM detection voltage also in a weak electric field.

The aforementioned problems of the present invention are solved by the following means.

Provided is a receiver capable of receiving an FM radio wave and an AM radio wave in the same frequency band (for example, the same channel). The receiver includes: a detection voltage output unit (for example, (FM detector+AM/FM SW)) that outputs an FM detection voltage obtained by detecting the FM radio wave when the FM detection voltage is determined to be at or above a first threshold; and a threshold change unit (for example, threshold) that sets the first threshold to a first value when a noise amount included in the FM detection voltage before threshold determination by the detection voltage output unit is larger than a predetermined value, and that sets the first threshold to a second value smaller than the first value when the noise amount is smaller than the predetermined value. Note that reference numerals and characters in the parentheses are reference numerals and the like denoting the elements in the embodiments, and do not limit the present invention.

According to the present invention, the FM detection voltage can be correctly outputted also in a weak electric field.

BRIEF DESCRIPTION OF THE DRAWINGS

FIG. 4 is a table showing criteria of judgement by a switch judgement unit.

DETAILED DESCRIPTION OF THE EMBODIMENTS

Figure 1:
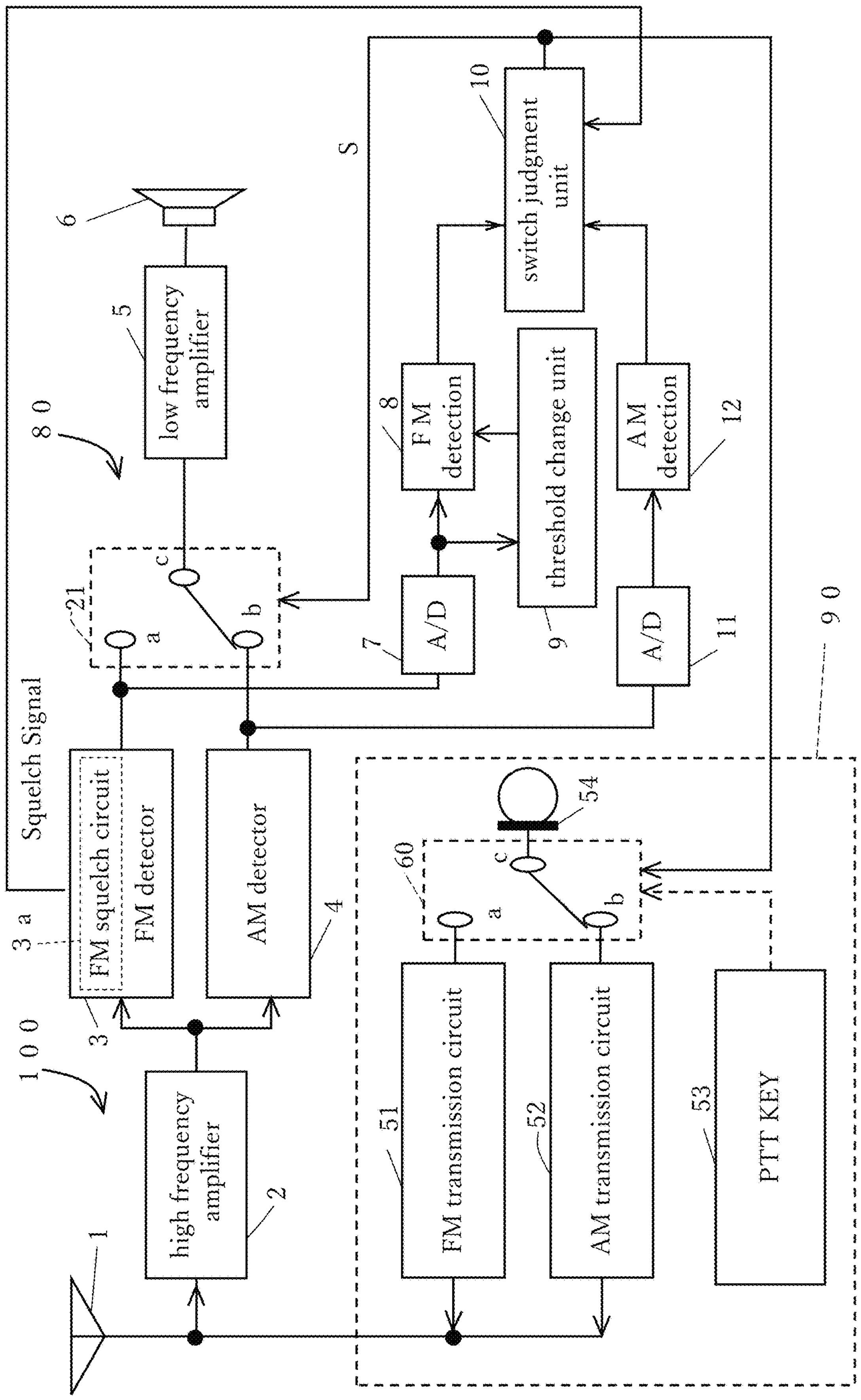
FIG. 1 is a configuration diagram of a transceiver that is a first embodiment of the present invention.

Embodiments of the present invention are described below in detail with reference to the drawings. Note that each of the drawings merely schematically show the present invention at such a level that the present invention can be sufficiently understood. Accordingly, the present invention is not limited to shown examples. Moreover, common components and similar components in the drawings are denoted by the same reference numerals, and overlapping description of these components are omitted.

First Embodiment

FIG. 1 is a configuration diagram of a transceiver that is a first embodiment of the present invention. The transceiver 100 includes a receiver 80 and a transmitter 90, and is configured to be capable of receiving an AM radio wave and an FM radio wave in the same frequency band (for example, the same channel). The receiver 80 includes an antenna 1, a high frequency amplifier 2, an FM detector 3, an AM detector 4, a switch 21, a low frequency amplifier 5, a speaker 6, A/D convertors 7 and 11, an FM detection unit 8, a threshold change unit 9, a switch judgement unit 10, and an AM detection unit 12. Note that a combination of the AM detector 4 and the switch 21 is referred to as detection voltage output unit.

The antenna 1 is a member that receives and transmits an electromagnetic wave (FM radio wave or AM radio wave), and is, for example, a whip antenna. The high frequency amplifier 2 is an amplification circuit that amplifies a high frequency signal of the electromagnetic wave received by the antenna 1. Note that the high frequency amplifier 2 includes a not-shown intermediate frequency amplification circuit. The FM detector 3 performs FM detection on the high frequency signal amplified by the high frequency amplifier 2, and outputs an audio signal. Moreover, the FM detector 3 includes an FM squelch circuit 3*a* that outputs a squelch signal. FM has such a characteristic that, at a low electric field strength (that is when there is no signal), the FM detector 3 outputs an audio signal of noise (about 450 mV in amplitude). This squelch signal indicates LOW level=no signal when a noise amount of an FM detection voltage is at or above a threshold (second threshold), and indicates HIGH level=with radio waves when the noise amount of the FM detection voltage is below the threshold (second threshold). Note that FM squelch circuit 3*a* is, for example, a circuit that determines whether a voltage of a signal of a high frequency (for example, 4 kHz) that is at or above an audio frequency is at or above the second threshold or is below the second threshold by utilizing the fact that the noise is white noise.

The AM detector 4 performs AM detection on the high frequency signal amplified by the high frequency amplifier 2, and outputs an audio signal. The switch 21 is a two-contact switch, and switches connection of a c terminal between an a terminal and a b terminal, by using an output signal S of the switch judgement unit 10. Specifically, the switch 21 performs switching between the audio signal outputted by the FM detector 3 and the audio signal outputted by the AM detector 4.

The low frequency amplifier 5 power-amplifies the audio signal outputted by the switch 21. The speaker 6 performs electrical to mechanical conversion of the audio signal (electric signal) power-amplified by the low frequency amplifier 5, and emits the signal as audio.

The A/D convertor 7 performs AD conversion on the FM detection voltage detected by the FM detector 3, every predetermined time interval (for example, 20 mSec), and stores a sample voltage in a storage unit. The FM detection unit 8 determines whether the output voltage of the A/D convertor 7 is at or above a threshold (first threshold) or is below the threshold (first threshold). When the output voltage of the A/D convertor 7 is at or above the first threshold, the FM detection unit 8 outputs detection of FM to the switch judgement unit 10. When the output voltage of the A/D convertor 7 is below the first threshold, the FM detection unit 8 outputs non-detection of FM to the switch judgement unit 10.

The threshold change unit 9 changes the first threshold used in the determination in the FM detection unit 8. For example, the threshold change unit 9 sets the first threshold to a first value when the FM detection voltage (for example, the noise amount included in the FM detection voltage) before the threshold voltage determination by the FM detection unit 8 is larger than a predetermined value, and sets the first threshold to a second value smaller than the first value when the FM detection voltage (for example, the noise amount included in the FM detection voltage) is smaller than the predetermined value.

Figure 2:
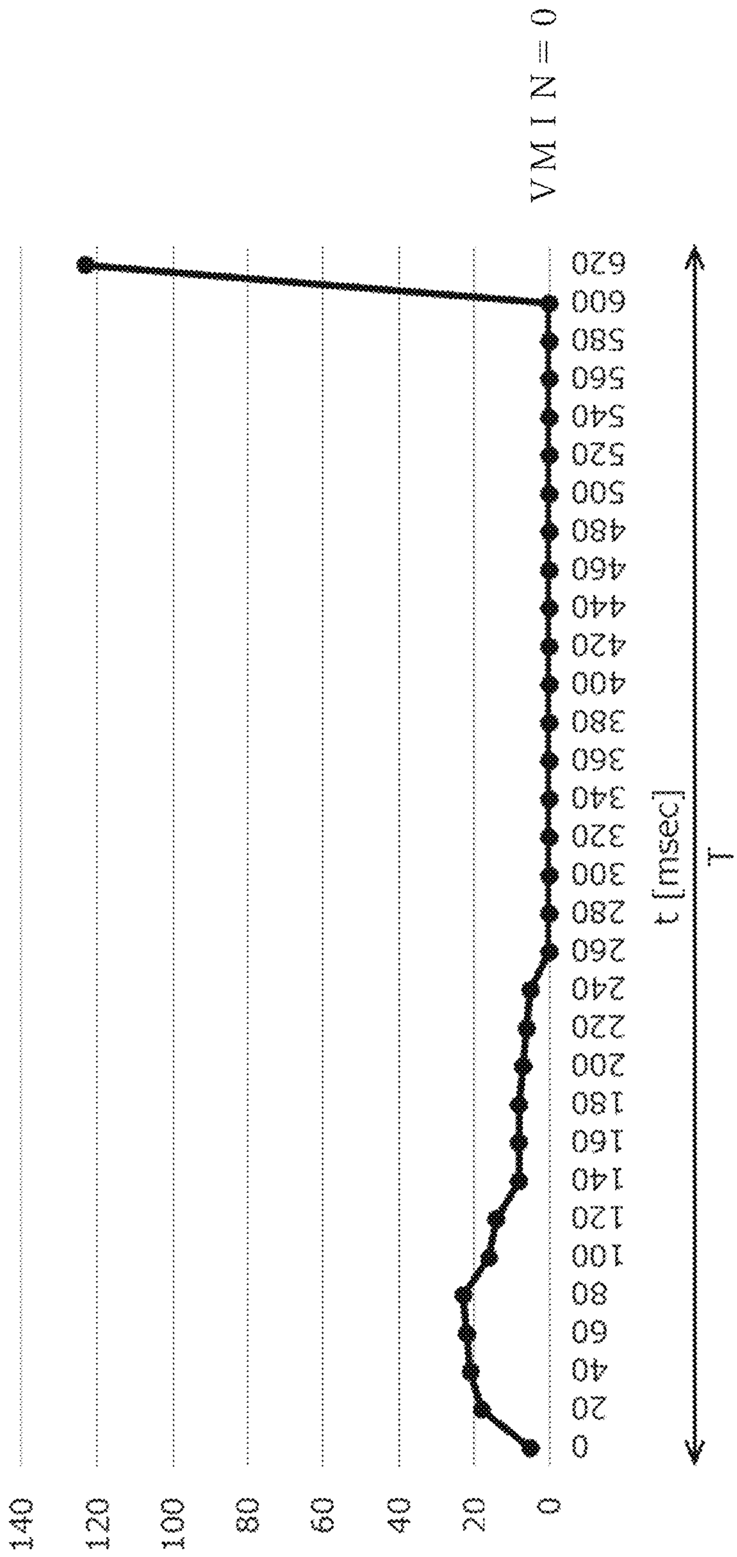
FIG. 2 is a diagram showing output voltages of an A/D convertor before threshold determination by an FM detection unit in the case of a normal received signal strength.

FIG. 2 is a diagram showing the output voltages of the A/D convertor 7 before the threshold determination by the FM detection unit 8 in the case of a normal received signal strength (for example, −47 dBm). The horizontal axis represents time t [mSec], and the vertical axis represents an output value (AD value) indicated by the A/D convertor 7.

The time t=0 is time a predetermined time period T (for example, T=620 mSec) before the moment (for example, t=620 mSec) when the FM detection unit 8 performs the threshold determination. The number of samples at this moment is (620 mSec/20 mSec+1 sample)=32 samples. The noise amount is small at the normal received signal strength.

A minimum output value VMIN in the predetermined time period T before the moment (for example, t=620 mSec) when the FM detection unit 8 performs the threshold determination is VMIN=0. The first threshold changed by the threshold change unit 9 is "minimum output value VMIN in predetermined time period T+α (for example, α=92 (corresponding to 450 mV))". For example, first threshold=VMIN+α=0+92=92.

Figure 3:
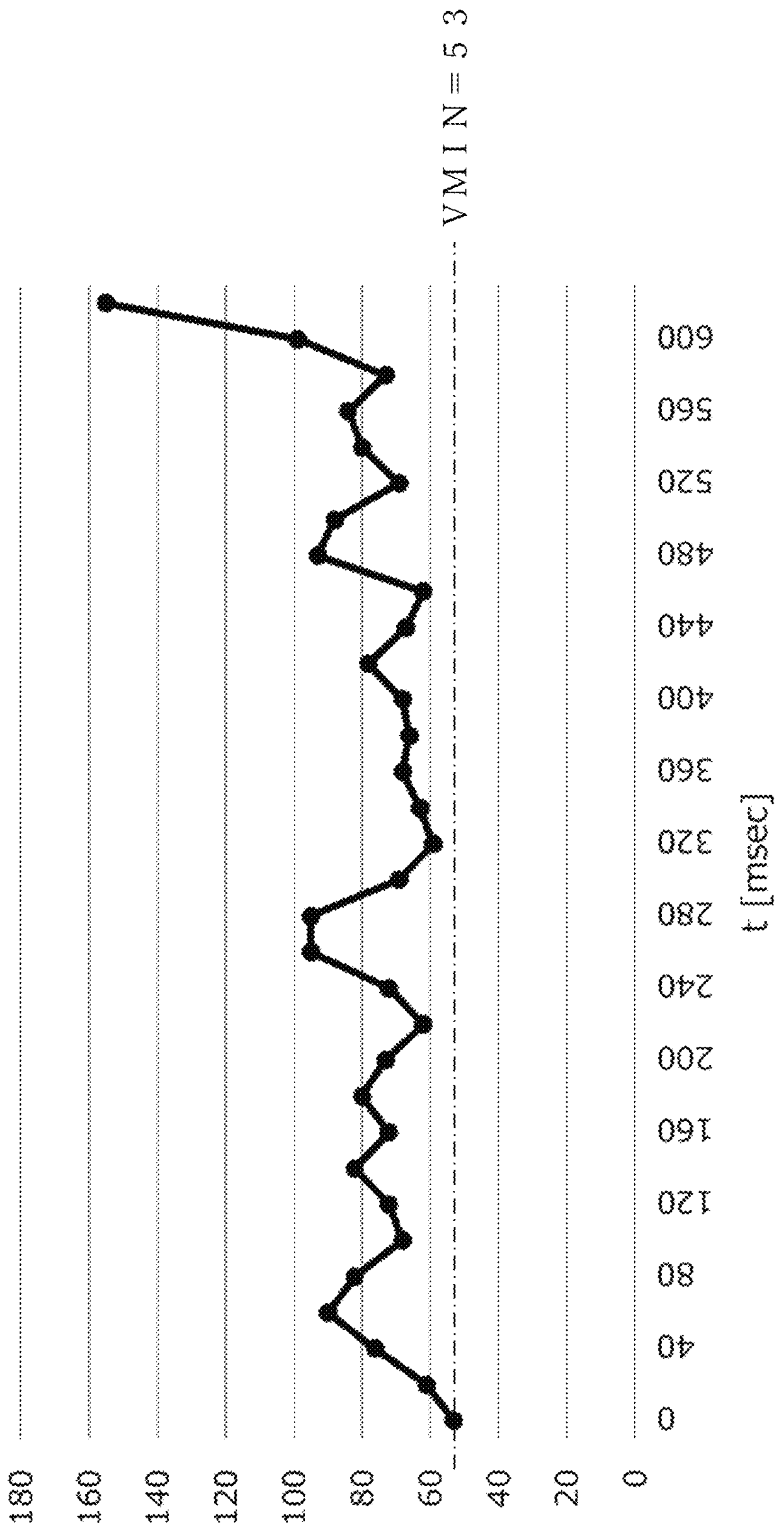
FIG. 3 is a diagram showing the output voltages of the A/D convertor before the threshold determination by the FM detection unit in the case of a weak electric field.

FIG. 3 is a diagram showing output voltages of the A/D convertor 7 before the threshold determination by the FM detection unit 8 in the case of a weak electric field (for example, −110 dBm). The horizontal axis represents time t [mSec], and the vertical axis represents an output value (AD value) indicated by the A/D convertor 7. In the weak electric field, the noise amount is larger than that in the normal received signal strength (FIG. 2), and the output value is high.

The minimum output value VMIN in the predetermined time period T before the moment (for example, t=620 mSec) when the FM detection unit 8 performs the threshold determination is VMIN=53. The first threshold changed by the threshold change unit 9 is "minimum output value VMIN in predetermined time period T+α (for example, α=92 (corresponding to 450 mV))". For example, first threshold=VMIN+α=53+92=145.

Specifically, for example, the threshold change unit 9 sets the first threshold to the first value (for example, (minimum output value VMIN+noise amplitude correspondence value α)=53+92=145) when the FM detection voltage (for example, the noise amount included in the FM detection voltage) before the threshold determination by the FM detection unit 8 is larger than the predetermined value, and sets the first threshold to the second value (for example, the noise amplitude correspondence value α=92) smaller than the first value when the FM detection voltage (for example, the noise amount included in the FM detection voltage) is smaller than the predetermined value.

The A/D convertor 11 samples an AM detection voltage outputted by the AM detector 4 every predetermined time interval (for example, 20 mSec), and stores the sample voltage in a not-shown storage unit. The AM detection unit 12 determines whether the sample voltage sampled by the A/D convertor 11 is at or above a threshold (fixed value) or is below the threshold (fixed value).

The switch judgement unit 10 controls the switch 21 based on the determination result of the FM detection unit 8, the determination result of the AM detection unit 12, and the squelch signal. Specifically, the switch judgement unit 10 performs control according to (1) to (8) of FIG. 4.

(1) In the case where: the determination result of the AM detection unit 12 indicates "below threshold"; the squelch signal indicates "no signal"; and the output signal of the FM detection unit 8 indicates "below threshold (variable)", the switch judgement unit 10 sets the switch 21 to the AM detector 4 side (b terminal). In other words, when the FM is "no signal", the switch judgement unit 10 sets the switch 21 to the AM detector 4 side even if the radio wave of AM is weak.

(2) In the case where: the output signal of the AM detection unit 12 indicates "below threshold"; the squelch signal indicates "no signal"; and the output signal of the FM detection unit 8 indicates "at or above threshold (variable)", the switch judgement unit 10 sets the switch 21 to the AM detector 4 side (b terminal).

Figure 5:
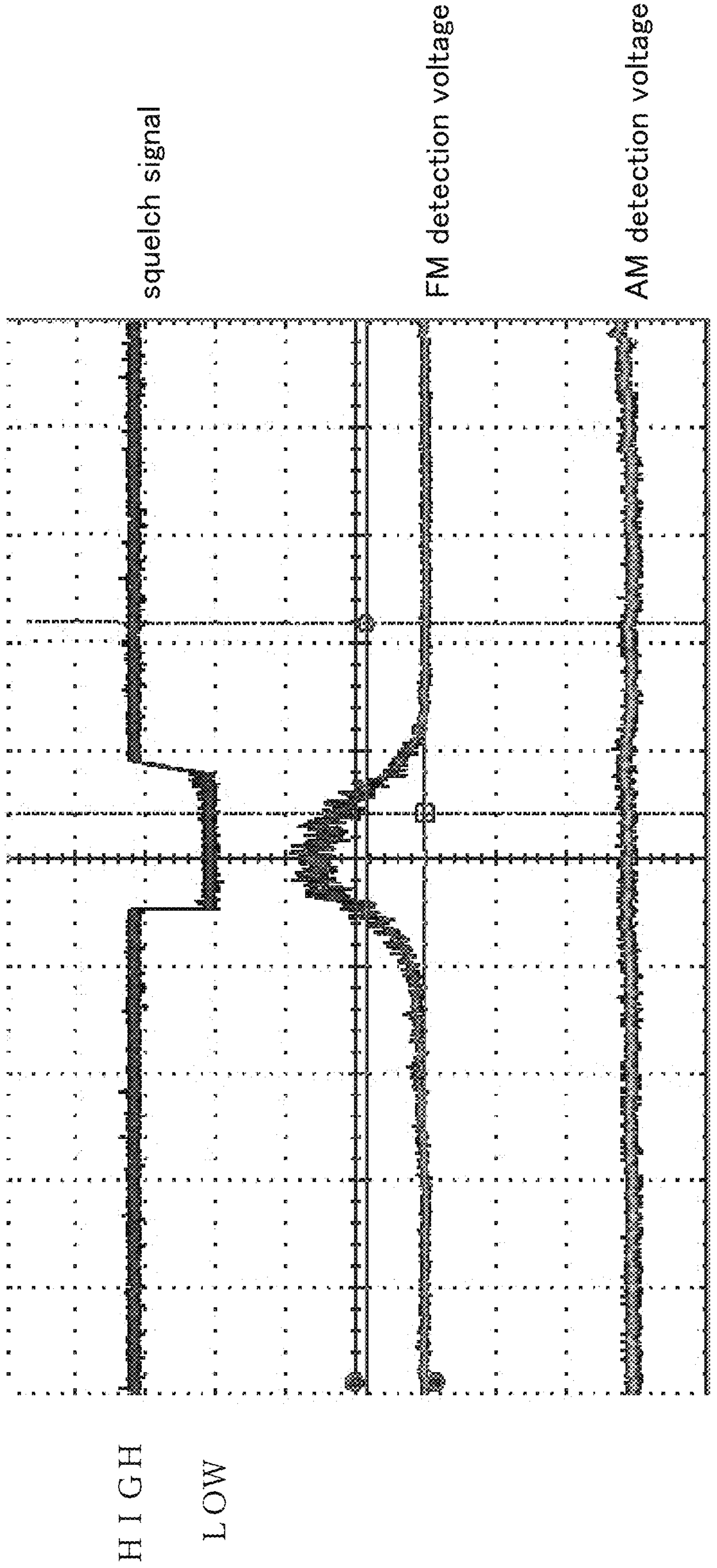
FIG. 5 is a diagram showing changes in an FM detection voltage and a squelch signal in a case where a receiver or a transmitter is moved near an edge of a range.

FIG. 5 is a diagram showing changes in the FM detection voltage and the squelch signal in the case where the receiver or the transmitter is moved near an edge of a range.

When the receiver or the transmitter is moved near the edge of the range of the weak electric field, the FM detection voltage fluctuates and the switch 21 may be switched to the FM mode. However, the switch 21 is switched to AM by utilizing transition of the squelch signal from HIGH level="with radio waves" to LOW level="no signal".

(3) In the case where: the output signal of the AM detection unit 12 indicates "below threshold"; the squelch signal indicates "with radio waves"; and the output signal of the FM detection unit 8 indicates "below threshold (variable)", the switch judgement unit 10 maintains a previous state. Specifically, when the previous state of the switch 21 is set to the AM detector 4 side, the switch judgement unit 10 maintains the switch 21 on the AM detector 4 side. Meanwhile, when the previous state of the switch 21 is set to the FM detector 3 side, the switch judgement unit 10 maintains the switch 21 on the FM detector 3 side.

Figure 6:
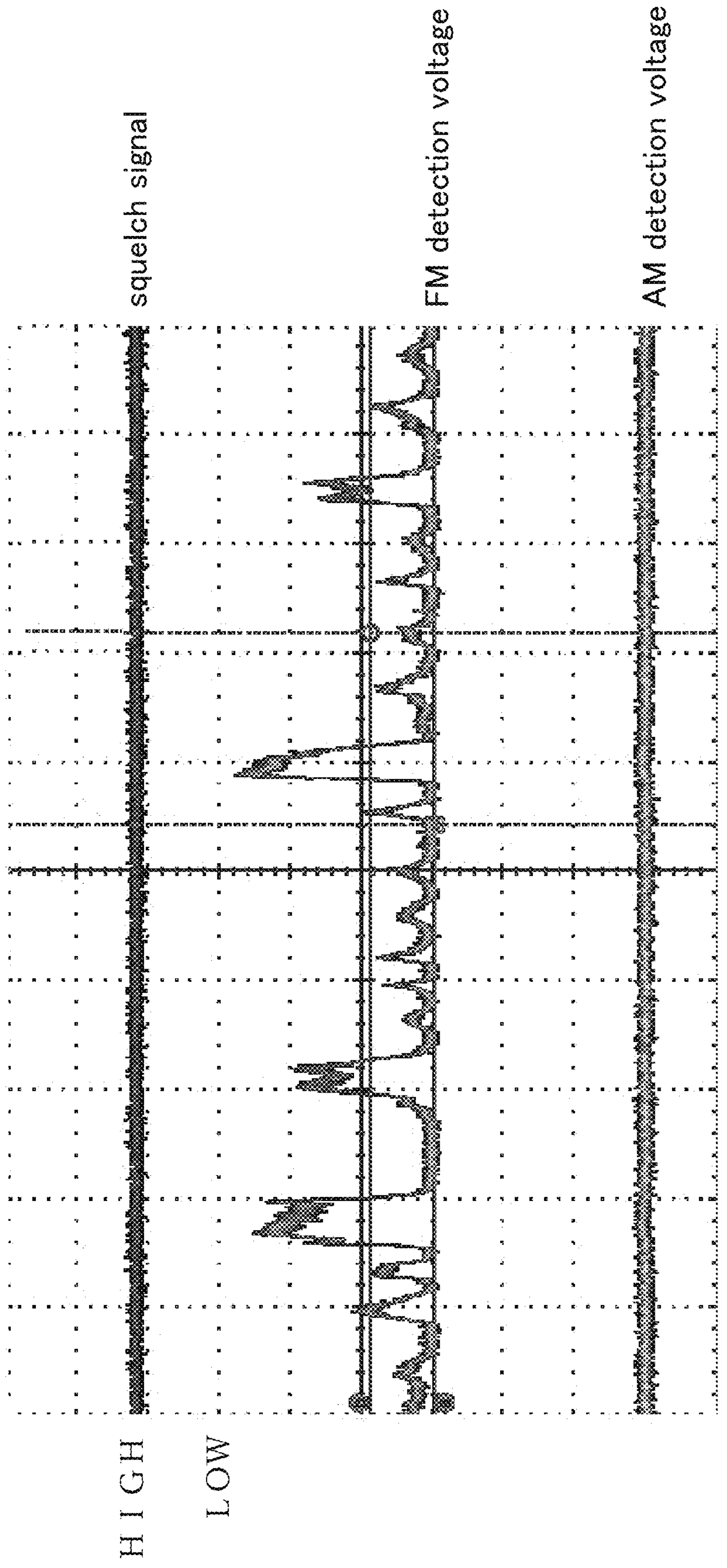
FIG. 6 is a diagram showing states of the FM detection voltage, an AM detection voltage, and the squelch signal in the case where a general audio signal is received.

FIG. 6 is a diagram showing states of the FM detection voltage, the AM detection voltage, and the squelch signal in the case where a general audio signal is received.

The FM detection voltage in the case where the general audio signal is received is not constant. Moreover, the squelch signal indicates HIGH level="with radio waves", and no AM detection voltage is outputted.

In this case, even if the FM detection voltage falls below the threshold, the switch 21 is maintained on the FM detector 3 side being the previous state without being switched to the AM detector 4 side.

(4) In the case where: the output signal of the AM detection unit 12 indicates "below threshold"; the squelch signal indicates "with radio waves"; and the output signal of the FM detection unit 8 indicates "at or above threshold (variable)", the switch judgement unit 10 sets the switch 21 to the FM detector 3 side.

(5) In the case where: the output signal of the AM detection unit 12 indicates "at or above threshold"; the squelch signal indicates "no signal"; and the output signal of the FM detection unit 8 indicates "below threshold (variable)", the switch judgement unit 10 sets the switch 21 to the AM detector 4 side.

(6) In the case where: the output signal of the AM detection unit 12 indicates "at or above threshold"; the squelch signal indicates "no signal"; and the output signal of the FM detection unit 8 indicates "at or above threshold (variable)", the switch judgement unit 10 sets the switch 21 to the AM detector 4 side.

(7) In the case where: the output signal of the AM detection unit 12 indicates "at or above threshold"; the squelch signal indicates "with radio waves"; and the output signal of the FM detection unit 8 indicates "below threshold (variable)", the switch judgement unit 10 sets the switch 21 to the AM detector 4 side.

(8) In the case where: the output signal of the AM detection unit 12 indicates "at or above threshold"; the squelch signal indicates "with radio waves"; and the output signal of the FM detection unit 8 indicates "at or above threshold (variable)", the switch judgement unit 10 sets the switch 21 to the AM detector 4 side.

Figure 7:
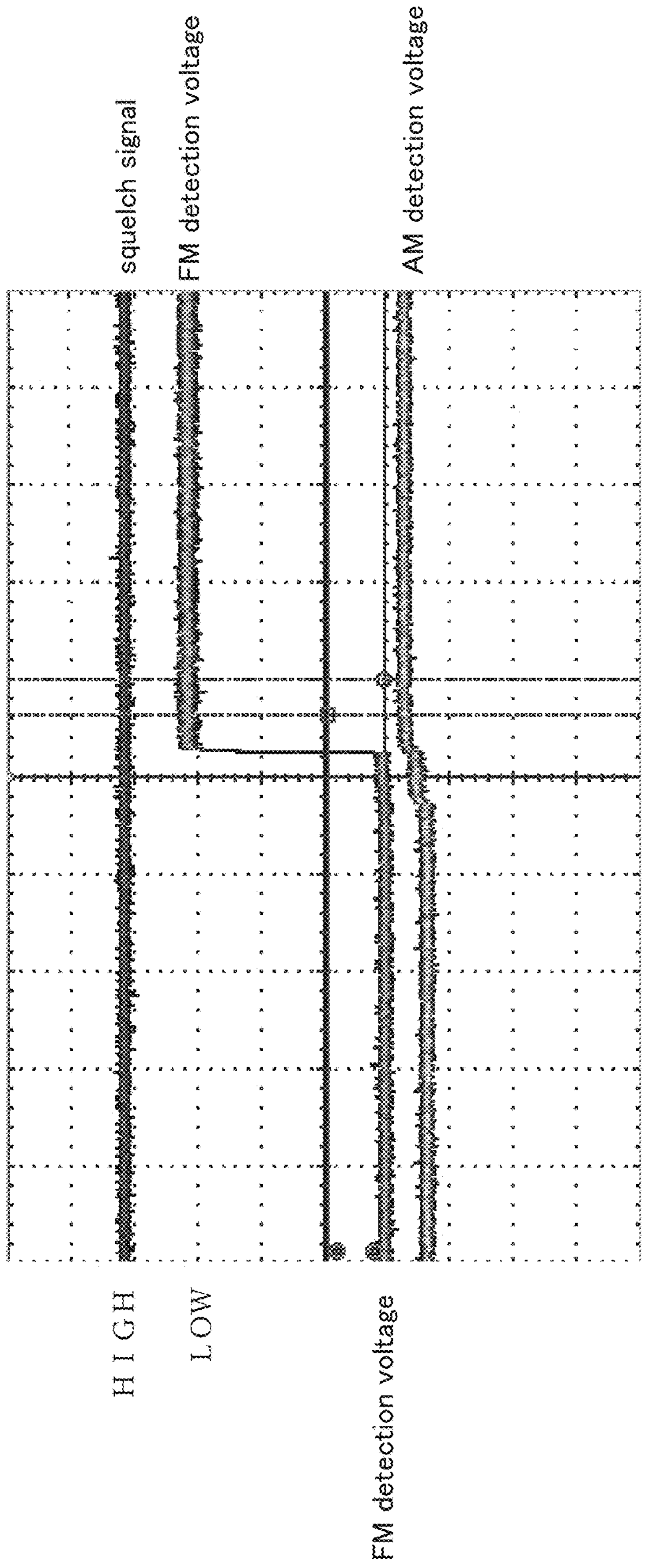
FIG. 7 is a diagram showing states of the FM detection voltage, the AM detection voltage, and the squelch signal in the case where the degree of modulation of AM is increased.

FIG. 7 is a diagram showing states of the FM detection voltage, the AM detection voltage, and the squelch signal in the case where the degree of modulation of AM is increased. The horizontal axis represents time, and the vertical axis represents a signal voltage.

In FIG. 7, the transceiver 100 is in the AM mode over the entire period, and the degree of modulation of AM is transitioned from 70% to 100% near the center of the time axis. This causes the AM detection voltage to increase and the FM detection voltage to rapidly increase, and AM and FM are detected. Note that the squelch signal indicates HIGH level="with radio waves". In this case, although FM is detected by the increase in the degree of modulation of AM, AM is actually received. Accordingly, priority is given to AM.

As described above, the receiver 80 of the present invention outputs one of the output signal (FM detection voltage) of the FM detector 3 and the output signal (AM detection voltage) of the AM detector 4 by switching the signal to be outputted with the switch 21. The switch 21 is controlled by the switch judgement unit 10 based on the determination result of the FM detection unit 8, the determination result of the AM detection unit 12, and the squelch signal.

The FM detection unit 8 determines whether the sample voltage obtained by subjecting the FM detection voltage to A/D conversion every predetermined time interval (for example, 20 mSec) is at or above the threshold (first threshold) or is below the threshold (first threshold). The threshold change unit 9 changes the threshold (first threshold) used in the determination in the FM detection unit 8. For example, the threshold change unit 9 sets the first threshold to the first value when the FM detection voltage (for example, the noise amount included in the FM detection voltage) before the threshold determination by the FM detection unit 8 is larger than the predetermined value, and sets the first threshold to the second value smaller than the first value when the FM detection voltage (for example, the noise amount included in the FM detection voltage) is smaller than the predetermined value.

Moreover, the AM detection unit 12 determines whether the sample voltage obtained by subjecting the AM detection voltage to A/D conversion every predetermined time interval (for example, 20 mSec) is at or above the threshold (fixed value) or is below the threshold (fixed value).

For example, when the determination result of the FM detection unit 8 is above the first threshold but the squelch signal is no signal, the switch judgement unit 10 sets the switch 21 to the AM detector 4 side. Moreover, in the case where: the determination result of the FM detection unit 8 is below the first threshold; the determination result of the AM detection unit 12 is below the threshold; and the squelch signal indicates "with FM radio waves", the switch judgement unit 10 maintains the previous state.

Furthermore, in the case where: the determination result of the FM detection unit 8 is at or above the first threshold; the determination result of the AM detection unit 12 is at or above the threshold; and the squelch signal indicates "with FM radio waves", the switch judgement unit 10 sets the switch 21 to the AM detector 4 side.

(Transmitter)

The transmitter 90 includes an FM transmission circuit 51, an AM transmission circuit 52, a push to talk (PTT) key (alternate switch) 53, a microphone 54, and a switch 60.

The microphone 54 converts mechanical vibration caused by a voice of a user to an electric signal. The switch 60 connects the microphone 54 to one of the FM transmission circuit 51 and the AM transmission circuit 52 based on the determination result of the switch judgement unit 10 or the state of the PTT key 53. The FM transmission circuit 51 performs FM modulation on the electric signal of the microphone 54, and performs FM transmission via the antenna 1. The AM transmission circuit 52 performs AM modulation on the electric signal of the microphone 54, and performs AM transmission via the antenna 1.

The switch 60 follows the determination result of the switch judgement unit 10, that is the selection state of the switch 21 in principle as shown by the solid line arrow. Specifically, the switch 60 selects the FM transmission circuit 51 when the switch 21 selects the FM detector 3, and selects the AM transmission circuit 52 when the switch 21 selects the AM detector 4. However, as an exceptional operation, as shown by the broken line arrow, when the PTT key 53 being a momentary switch is pushed once and is continuously kept being pushed, the switch 60 is assumed to select the AM transmission circuit 52. When the PTT key 53 is pushed twice and is continuously kept being pushed, the switch 60 is assumed to select the FM transmission circuit 51. Note that the FM transmission circuit 51 includes not-shown FM modulator and high frequency power amplification circuit. Moreover, the AM transmission circuit 52 includes not-shown AM modulator and high frequency power amplification circuit.

COMPARATIVE EXAMPLE

Figure 8:
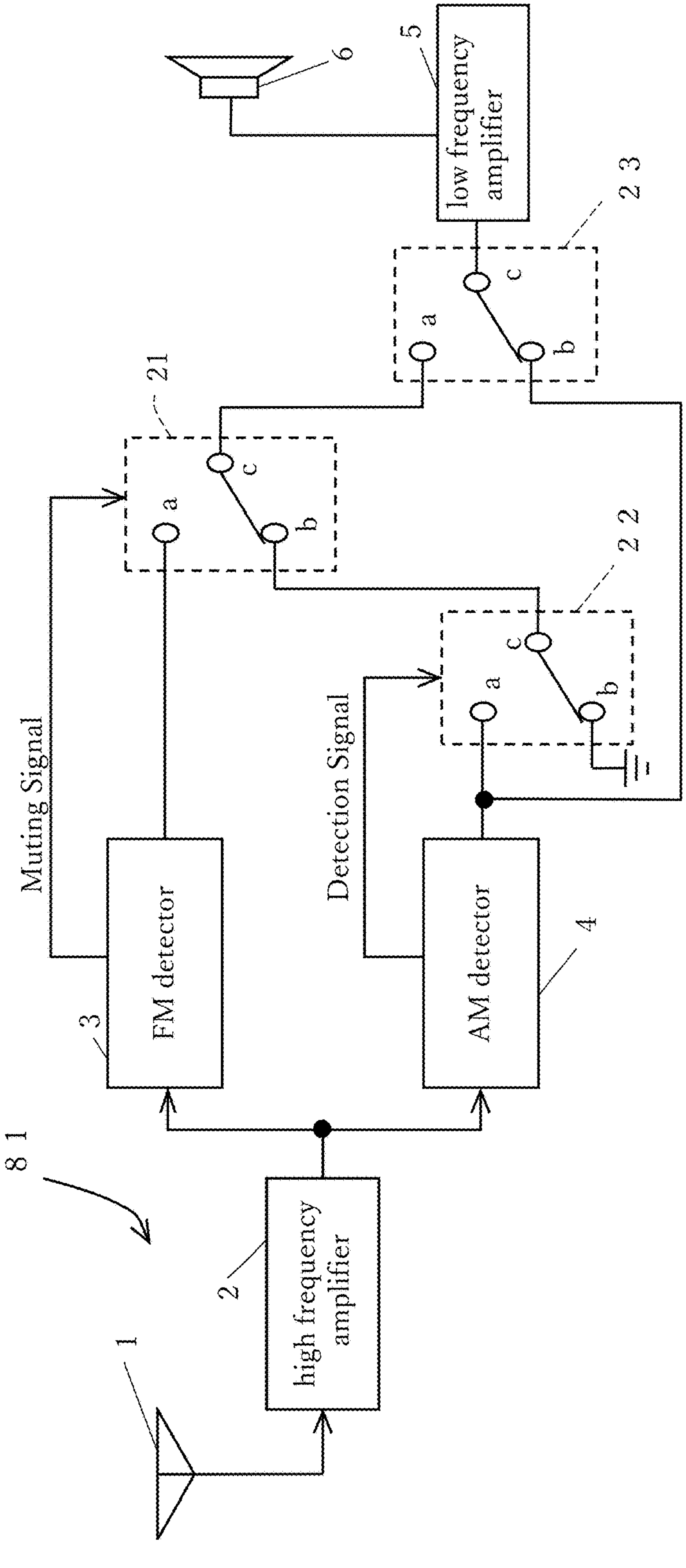
FIG. 8 is a configuration diagram of a receiver that is a comparative example of the present embodiment.

FIG. 8 is a configuration diagram of a receiver that is a comparative example of the present embodiment.

The receiver 81 includes the antenna 1, the high frequency amplifier 2, the FM detector 3, the AM detector 4, the low frequency amplifier 5, the speaker 6, and the switch 21 like the receiver 80 of the first embodiment. However, the receiver 81 of the comparative example is different in that the receiver 81 does not include the A/D convertors 7 and 11, the FM detection unit 8, the threshold change unit 9, the switch judgement unit 10, or the AM detection unit 12, and includes switches 22 and 23.

The switch 21 is controlled by a muting signal as in the receiver 80 of the first embodiment, and the a terminal is connected to the output of the FM detector 3. The b terminal of the switch 21 is connected to a c terminal of the switch 22, and the c terminal of the switch 21 is connected to an a terminal of the switch 23. The switch 22 is a two-contact switch controlled by the detection signal of the AM detector 4. An a terminal is connected to the output of the AM detector 4, and a b terminal is grounded. The switch 23 is a switch manually selected by the user. Specifically, the a terminal is selected when the user desires automatic switching, and a b terminal is selected when the user desires AM reception. The b terminal of the switch 23 is connected to the output of the AM detector 4 and the a terminal of the switch 22, and a c terminal is connected to the low frequency amplifier 5.

The muting signal outputs LOW level="no signal" when there is no FM radio wave output, and outputs HIGH level="with radio waves" when there is the FM radio wave like the squelch signal in the first embodiment. The detection signal outputs "no signal" when there is no detection output voltage of AM, and outputs "with radio waves" when there is the detection output voltage of AM. A threshold for determining presence and absence of the radio waves in this case is a fixed value.

In the case where FM and AM are "no signal", the b terminals are selected in the switches 21 and 22, and the ground voltage is outputted to the c terminal of the switch 21. Note that, when the b terminal is selected in the switch 23, the output voltage of the AM detector 4 is outputted to the c terminal of the switch 23.

Figure 9:
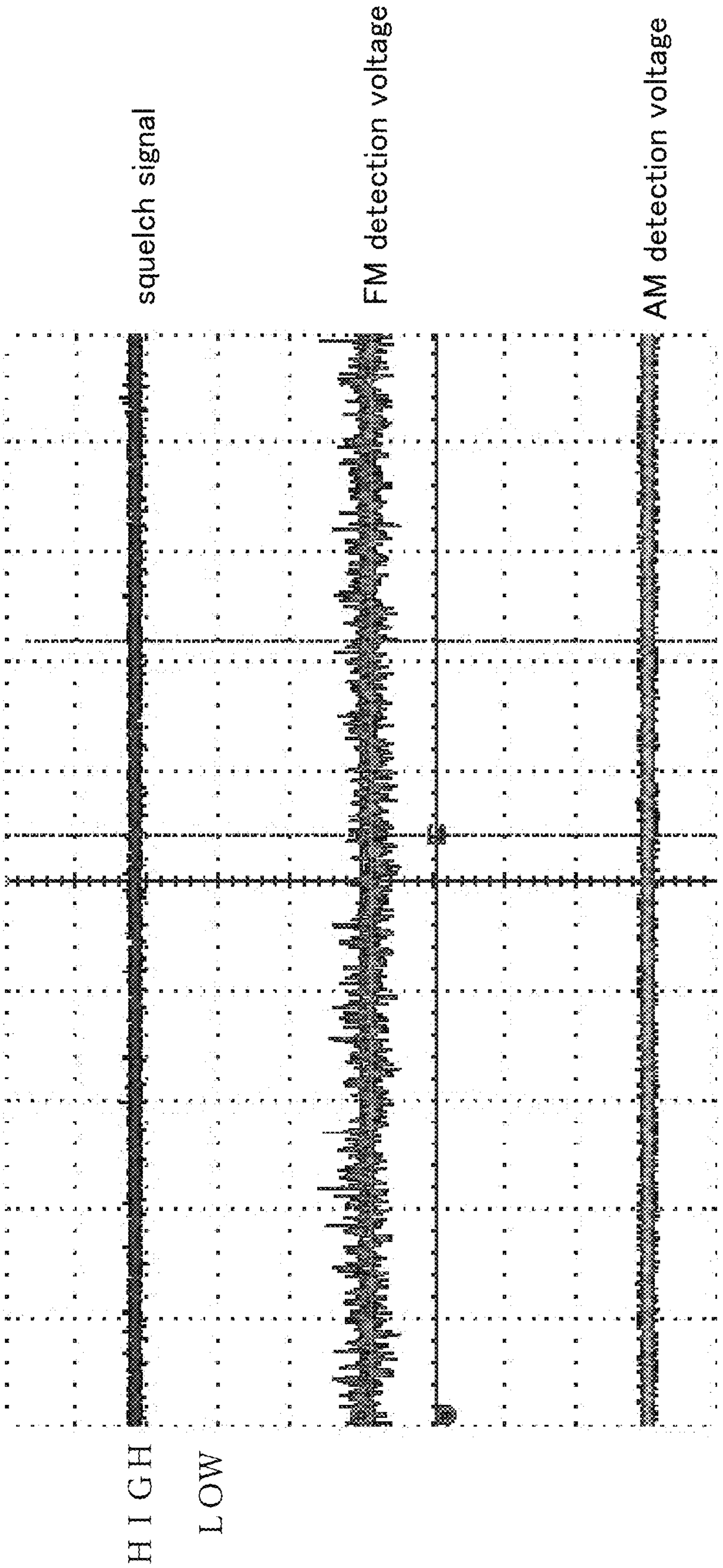
FIG. 9 is a diagram showing states of the FM detection voltage and the squelch signal in the comparative example of the present invention.

FIG. 9 is a diagram showing states of the FM detection voltage and the muting signal in the comparative example of the present invention.

When the threshold of the muting signal is fixed to 450 mV, the noise voltage exceeds this threshold, and the muting signal is thus erroneously determined to be set to HIGH level="with radio waves" of FM.

Second Embodiment

In the first embodiment, the first threshold for the threshold determination of the noise amount of the FM detection voltage is changed depending on the magnitude of the noise amount before the threshold determination. However, the first threshold can be changed by using a received signal strength (received signal strength indicator (RSSI)) signal.

Figure 10:
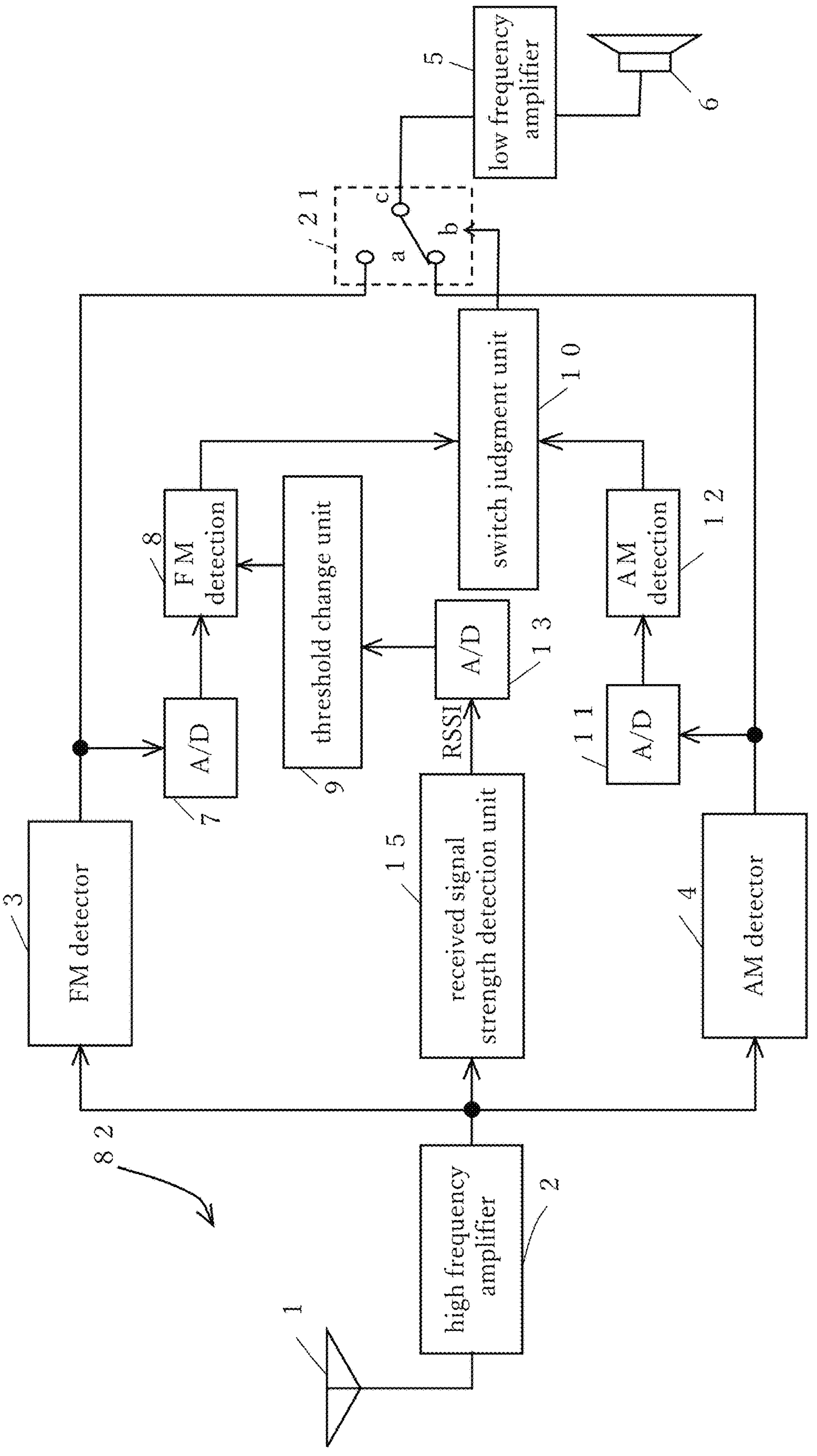
FIG. 10 is a configuration diagram of a receiver that is a second embodiment of the present invention.

FIG. 10 is a configuration diagram of a receiver in a second embodiment of the present invention.

The receiver 82 includes the antenna 1, the high frequency amplifier 2, the FM detector 3, the AM detector 4, the low frequency amplifier 5, the speaker 6, the switch 21, the A/D convertors 7 and 11, the FM detection unit 8, the threshold change unit 9, the switch judgement unit 10, and the AM detection unit 12 like the receiver 80 (FIG. 1) in the first embodiment. However, the receiver 82 in the present embodiment is different from the receiver 80 (FIG. 1) in the first embodiment in that the receiver 82 newly includes a received signal strength detection unit 15 and an A/D convertor 13.

The received signal strength detection unit 15 outputs the received signal strength signal (RSSI signal) based on the output voltage of the high frequency amplifier 2. The A/D convertor 13 performs A/D conversion on the received signal strength signal, and outputs the sample voltage thereof to the threshold change unit 9. Specifically, in the threshold change unit 9 (FIG. 1) in the first embodiment, the first threshold is changed depending on the magnitude of the sample voltage sampled before the threshold determination of the FM detection voltage. Meanwhile, in the threshold change unit 9 of the present embodiment, the first threshold is changed depending on the received signal strength signal (RSSI signal) at the moment of the threshold determination.

Third Embodiment

In the first embodiment, the FM squelch signal is used. However, the configuration may be such that the noise amount is detected by using the sample voltage obtained by sampling the FM detection voltage with the A/D convertor 7, and the threshold (first threshold) is changed by using the detected noise amount.

Figure 11:
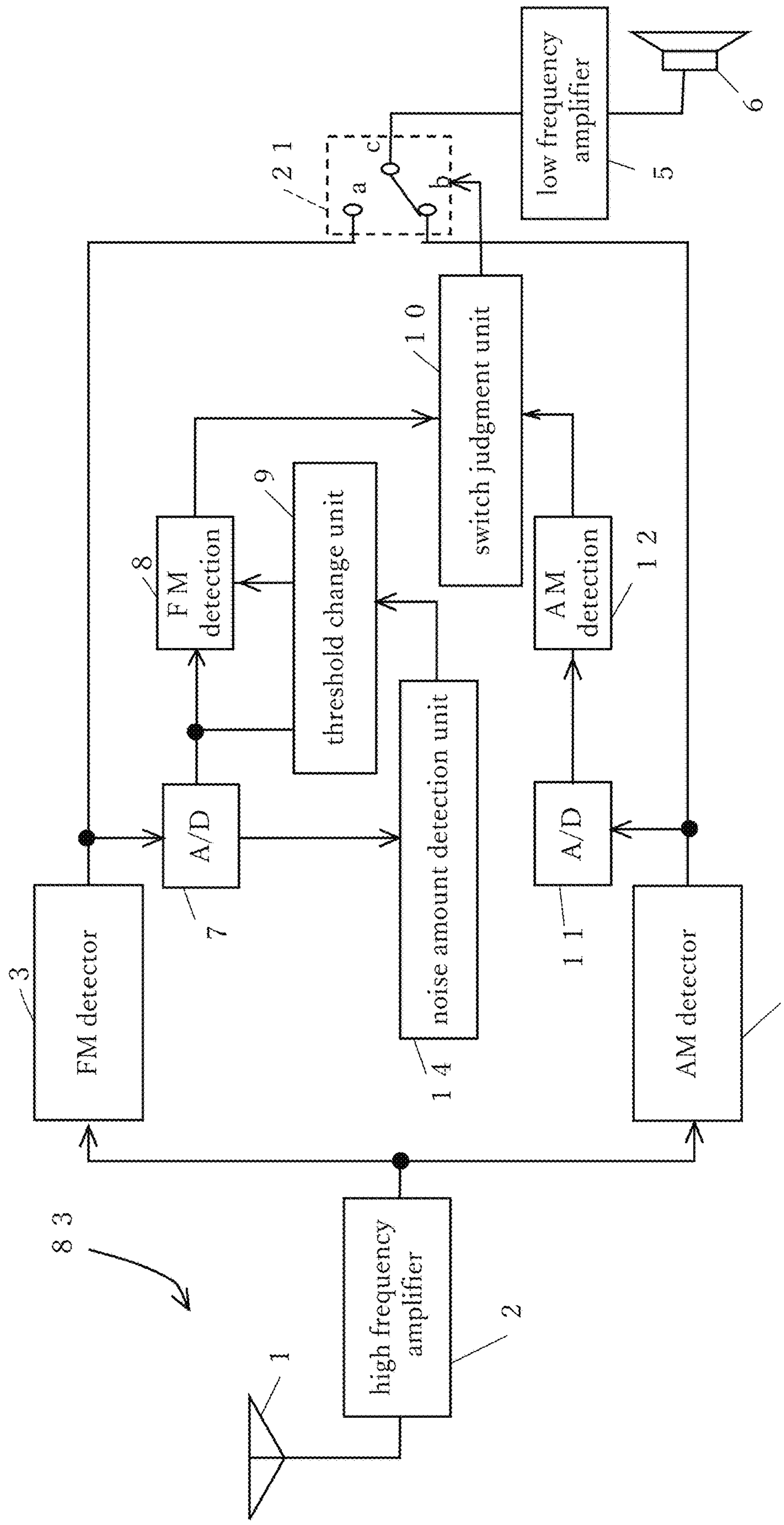
FIG. 11 is a configuration diagram of a receiver that is a third embodiment of the present invention.

FIG. 11 is a configuration diagram of a receiver that is a third embodiment of the present invention.

The receiver 83 includes the antenna 1, the high frequency amplifier 2, the FM detector 3, the AM detector 4, the low frequency amplifier 5, the speaker 6, the switch 21, the A/D convertors 7 and 11, the FM detection unit 8, the threshold change unit 9, the switch judgement unit 10, and the AM detection unit 12 like the receiver 80 (FIG. 1) in the first embodiment. However, the receiver 83 of the present embodiment is different from the receiver 80 in the first embodiment in that the receiver 83 includes a noise amount detection unit 14.

The noise amount detection unit 14 detects the noise amount by using the sample voltage obtained by sampling the FM detection voltage with the A/D convertor 7. Note that the sampling time of the A/D convertor 7 is not necessarily 20 mSec given as an example in the first embodiment. The threshold change unit 9 changes the first threshold used in the FM detection by the FM detection unit 8, based on the noise amount detected by the noise amount detection unit 14.

Modified Example

The present invention is not limited to each of the aforementioned embodiments, and can be carried out while being modified within a scope not departing from the spirit of the present invention. For example, modifications are as follows.

(1) In the receiver 80 (FIG. 1) of the first embodiment, the first threshold is changed depending whether the FM detection voltage at the predetermined time (for example, 620 mSec) before the moment when the FM detection unit 8 performs the threshold determination is larger than the predetermined value or not. However, the first threshold may be changed depending on whether an average detection voltage obtained by averaging the FM detection voltages before the threshold determination is larger than a predetermined value or not. The FM detector 3 that outputs the FM detection voltage before the threshold determination and a calculation unit that calculates the average detection voltage before the threshold determination forms a pre-threshold determination detection voltage calculation unit. Note that the FM detection voltages to be averaged are typically the FM detection voltage at the predetermined time period (for example 620 mSec) before the threshold determination by the FM detection unit 8 to the FM detection voltage at the threshold determination, but are not limited to these.

What is claimed is:

1. A receiver capable of receiving an FM radio wave and an AM radio wave in a same frequency band, the receiver comprising:
- an FM detector configured to generate an FM detection voltage from a received FM radio wave;
- an AM detector configured to generate an AM detection voltage from a received AM radio wave;
- a switch configured to output either one of the FM detection voltage or the AM detection voltage;
- an A/D converter configured to sample the FM detection voltage at predetermined time intervals;
- a comparator configured to determine whether a sampled FM detection voltage is at or above a first threshold;
- a threshold change circuit configured to:
  - set the first threshold to a first value when a noise amount included in the FM detection voltage, the noise amount being derived from sampled FM detection voltages obtained during a predetermined time period before the determination by the comparator, is larger than a predetermined value; and
  - set the first threshold to a second value smaller than the first value when the noise amount is smaller than the predetermined value; and
- a switch judgement circuit configured to control the switch to output the FM detection voltage when the comparator determines that the sampled FM detection voltage is at or above the first threshold.

2. The receiver according to claim 1, further comprising:
- an FM squelch circuit configured to determine whether the noise amount included in the FM detection voltage is at or above a second threshold; wherein
- when the FM squelch circuit determines that the noise amount is at or above the second threshold, the switch judgement circuit controls the switch to output the AM detection voltage generated by the AM detector.

3. The receiver according to claim 1, further comprising:
- a memory configured to successively store the FM detection voltage every predetermined time interval;
- a calculator configured to calculate an average value of a plurality of the sampled FM detection voltages obtained during a predetermined time period before the determination by the comparator, wherein
- the threshold change circuit is configured to:
  - set the first threshold to the first value when the average value is larger than a predetermined value, and set the first threshold to the second value smaller than the first value when the average value is smaller than the predetermined value.

4. A transceiver comprising:
- the receiver according to claim 1, including an FM squelch circuit configured to determine whether a noise amount included in the FM detection voltage is at or above a second threshold; and
- a transmitter configured to: perform FM transmission when the comparator of the receiver determines that the sampled FM detection voltage is at or above the first threshold; and perform AM transmission when the FM squelch circuit determines that the noise amount is at or above the second threshold.

5. The transceiver according to claim 4, further comprising a transmitter that performs AM transmission when a momentary switch is pushed once and the pushed state is maintained, and that performs FM transmission when the momentary switch is pushed twice and the pushed state is maintained.

6. The receiver according to claim 2, further comprising:
- a memory configured to successively store the FM detection voltage every predetermined time interval;
- a calculator configured to calculate an average value of a plurality of the sampled FM detection voltages obtained during a predetermined time period before the determination by the comparator, wherein
- the threshold change circuit is configured to:
  - set the first threshold to the first value when the average value is larger than a predetermined value, and set the first threshold to the second value smaller than the first value when the average value is smaller than the predetermined value.

7. A transceiver comprising:
- the receiver according to claim 2, including the FM squelch circuit configured to determine whether the noise amount included in the FM detection voltage is at or above the second threshold; and
- a transmitter configured to: perform FM transmission when the comparator of the receiver determines that the sampled FM detection voltage is at or above the first threshold; and perform AM transmission when the FM squelch circuit determines that the noise amount is at or above the second threshold.

8. The transceiver according to claim 7, further comprising a transmitter that performs AM transmission when a momentary switch is pushed once and the pushed state is maintained, and that performs FM transmission when the momentary switch is pushed twice and the pushed state is maintained.

9. A transceiver comprising:

the receiver according to claim 3, including an FM squelch circuit configured to determine whether a noise amount included in the FM detection voltage is at or above a second threshold; and a transmitter configured to: perform FM transmission when the comparator of the receiver determines that the sampled FM detection voltage is at or above the first threshold; and perform AM transmission when the FM squelch circuit determines that the noise amount is at or above the second threshold.

10. The transceiver according to claim 9, further comprising a transmitter that performs AM transmission when a momentary switch is pushed once and the pushed state is maintained, and that performs FM transmission when the momentary switch is pushed twice and the pushed state is maintained.

* * * * *